G. DILL.
FLY TRAP.
APPLICATION FILED MAR. 29, 1911.
1,009,387.
Patented Nov. 21, 1911.
2 SHEETS—SHEET 2.
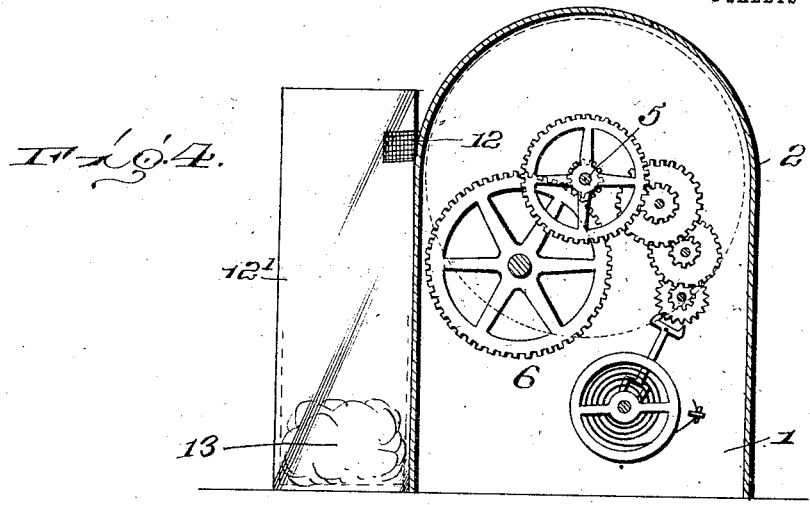
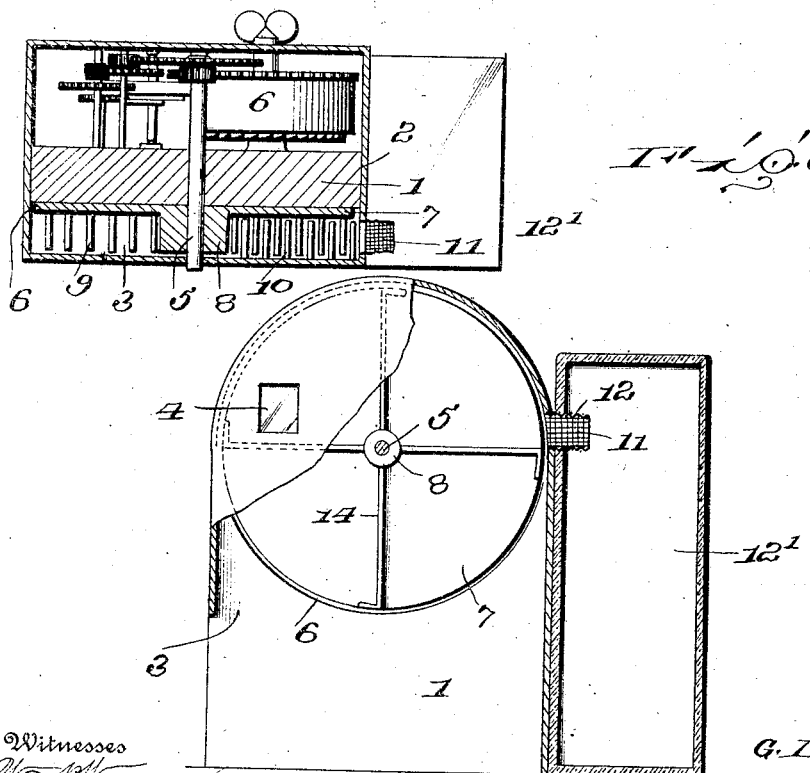
Witnesses
Inventor
G. Dill
By
Attorneys.

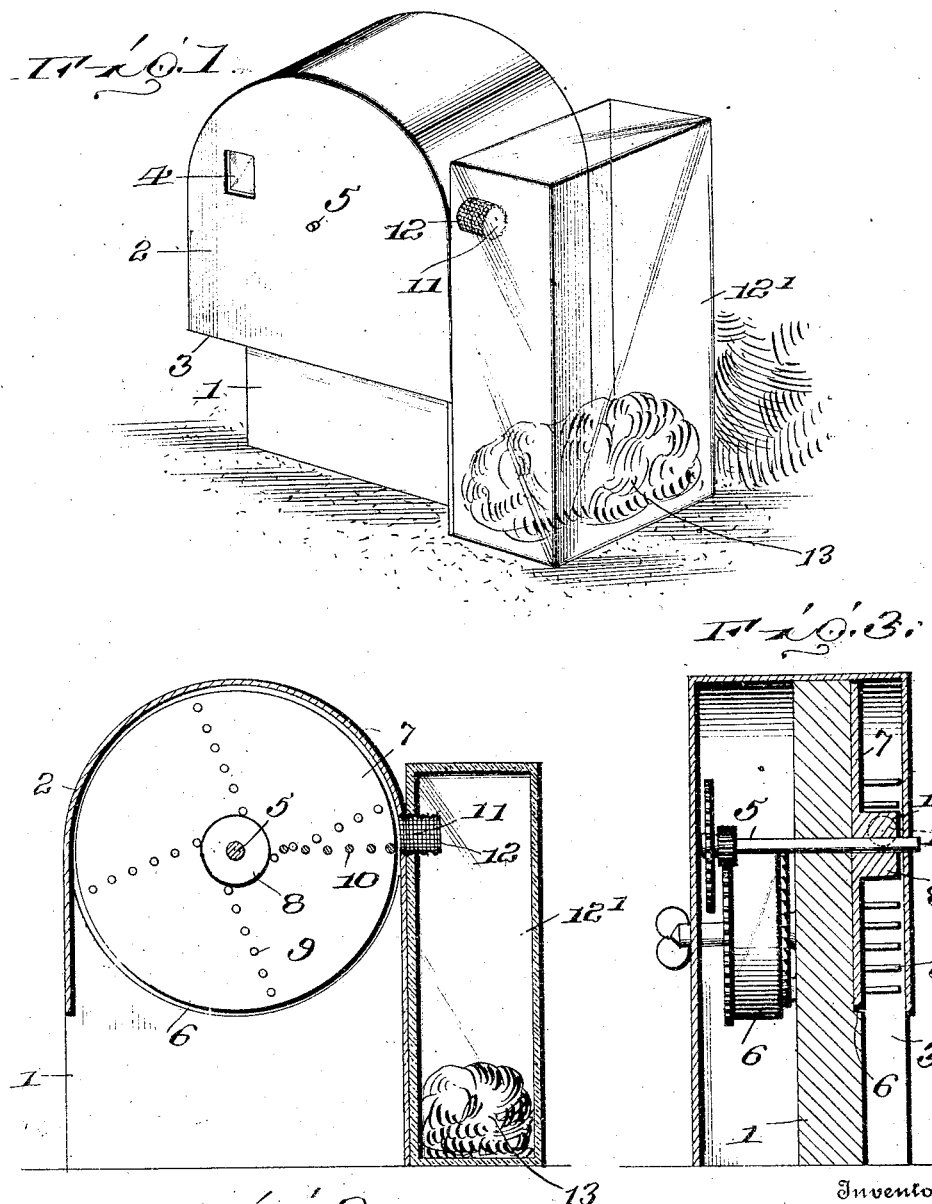

UNITED STATES PATENT OFFICE.

GEORGE DILL, OF OAKES, NORTH DAKOTA.

FLY-TRAP.

1,009,387.

Specification of Letters Patent. Patented Nov. 21, 1911.

Application filed March 29, 1911. Serial No. 617,775.

*To all whom it may concern:*

Be it known that I, GEORGE DILL, a citizen of the United States, residing at Oakes, in the county of Dickey and State of North Dakota, have invented certain new and useful Improvements in Fly-Traps, of which the following is a specification.

This invention relates to fly traps, and has for its object to provide a simple structure adapted to be operated by a spring or other motor for the purpose of entrapping the flies and forcing them into a receptacle containing a poison or other destructive fluid or element.

With the above object in view, the structure includes a casing in which a disk is mounted for rotation and which is provided upon one side with a series of sweeps. The casing is provided at its lower portion with an inlet opening and in its side with a transparency which serves as a lure for the insects. The said disk is operatively connected with the motor in any suitable manner, and at the side of said casing is mounted the receptacle, which is provided with an opening through which its interior communicates with the interior of said casing.

For a full understanding of the invention reference is to be had to the following description and accompanying drawing, in which:

Figure 1 is a perspective view of the fly trap connected with the motor; Fig. 2 is a sectional view of the trap; Fig. 3 is a sectional view of the trap taken at a right angle to the view illustrating Fig. 2; Fig. 4 is a sectional view of the trap taken through one form of the motor therefor; Fig. 5 is a horizontal sectional view of the trap; Fig. 6 is a side elevation, with parts broken away, of the modified form of the trap.

Corresponding and like parts are referred to in the following description and indicated in all the views of the accompanying drawing by the same reference characters.

The casing of the trap consists of a block 1, upon which is mounted a hood 2. One side of the hood 2 is spaced from one of the faces of the block 1, and the lower edge of the hood does not reach to the lower end of the block, but terminates short of the same, providing the opening 3, through which the flies may pass between the said block and the hood. The hood 2 is provided in its side which is spaced from the block with a transparency 4 which admits light into the space between the upper portions of the hood and block, and this light serves as a lure for enticing the flies to pass up through the space between the said block and hood.

A shaft 5 is journaled in the block 1 under the hood 2 and is operatively connected with a spring or other motor 6. The block 1 is provided in that face which is adjacent to the side of the hood having the transparency 4 with a depression 6, in which is located a disk 7. The disk 7 is fixed to the shaft 5 and has an outer surface flush with the outer surface of the lower portion of the block 1. A head 8 is fixed to the shaft 5 and extends transversely across the space between the block 1 and the side of the hood 2.

In the preferred form of the invention the disk 7 is provided with a series of sweeps 9, each of which consists of a row of pins, the said rows extending from the periphery of the head 8 to the periphery of the disk 7, or approximately so, and each row of pins is alined tangentially with relation to the head 8. The hood 2 is provided upon its inner side with a row of pins 10 which constitutes a barrier and extends approximately from the periphery of the head 8 to the side edge of the hood 2 at a point just below an opening 11 provided in the side edge of the said hood. A receptacle 12' is located at the side of the hood 2 and is provided with an opening to receive a screen passageway 12 which surrounds the opening 11 in the side of the hood 2 and projects outwardly therefrom.

The receptacle 12' is preferably in the form of a glass vessel and constitutes a pound, although the material and configuration of the vessel is immaterial. The receptacle 12' contains a poisonous liquid 13 or its equivalent. In this form of the invention the shaft 5 and its attached parts are maintained in a state of rotation by the spring motor 6, and the flies will alight upon the side of the block 1 and pass up under the hood 2 toward the transparency 4. The sweeps 9 move in an upward direction toward the transparency and when the flies step upon the disk 7 they are carried upward by the disk and the sweeps 9 until they arrive at the opening 11, at which point they are forced through into the receptacle 12' by the sweeps 9, for the reason that they cannot pass between the pins of the barrier 10. The tangential disposition of the sweeps 9 with relation to the head 8 forces the flies out through the opening 11 and does not crush them between the pins of the sweeps 9 and the pins of the barrier 10, as the pins of the said sweeps pass through the openings between the pins of the barrier. As soon as the flies enter the receptacle 12' they are subjected to the fumes or influence of the poison 13 into which they fall, and die. The receptacle 12' may be readily detached from the hood 2 and may be emptied of its contents and replenished with the poison 13 at desired intervals.

In the modified form of the invention, the sweeps 9, composed of rows of pins, and the barrier 10 are dispensed with, and in lieu thereof the disk 7 is provided with sweeps 14 of sheet material. These sweeps operate in a similar manner as that described in connection with the sweeps 9, with the exception that they do not force the flies through the opening 11, but as soon as the flies realize that they are being influenced by the sweeps they will seek to make an escape from the trap and will attempt to make an exit through the first available opening. They are carried toward the opening 11 by the said sweeps and will pass through the same into the receptacle, and the same consequences as that above set forth will result.

Having thus described the invention, what I claim as new is:

A trap comprising a block, an opaque hood located thereon with its lower edge terminating short of the lower edge of the block, said hood having in its side a transparent lure, a disk journaled between the block and the hood and having its outer face in the same plane with the outer face of the block below the hood, a pound connected with the hood, means for rotating the disk, sweeps mounted upon the disk and located under the hood and arranged to move across the lure in the hood.

In testimony whereof, I affix my signature in presence of two witnesses.

GEORGE DILL. [L. S.]

Witnesses:
J. E. BUNDAY,
J. F. NICHOLS.